United States Patent [19]

Nguyen et al.

[11] Patent Number: 5,737,592
[45] Date of Patent: Apr. 7, 1998

[54] ACCESSING A RELATIONAL DATABASE OVER THE INTERNET USING MACRO LANGUAGE FILES

[75] Inventors: Tam Minh Nguyen, San Jose; Venkatachary Srinivasan, Santa Clara, both of Calif.

[73] Assignee: International Business Machines Corporation, Armonk, N.Y.

[21] Appl. No.: 491,742

[22] Filed: Jun. 19, 1995

[51] Int. Cl.$^6$ .................................................. G06F 17/30
[52] U.S. Cl. ...................... 395/604; 395/610; 395/602
[58] Field of Search ..................... 395/611, 609, 395/604, 610, 602, 615

[56] References Cited

U.S. PATENT DOCUMENTS

| | | | |
|---|---|---|---|
| 4,506,326 | 3/1985 | Shaw et al. | 395/604 |
| 5,175,814 | 12/1992 | Anick et al. | 395/348 |
| 5,201,046 | 4/1993 | Goldberg et al. | 395/611 |
| 5,355,474 | 10/1994 | Thuraisngham | 395/609 |
| 5,530,852 | 6/1996 | Meske, Jr. et al. | 395/610 |

FOREIGN PATENT DOCUMENTS

| | | |
|---|---|---|
| 0 491 517 | 6/1992 | European Pat. Off. . |
| WO92/16903 | 10/1992 | WIPO . |

OTHER PUBLICATIONS

IBM Research Report; "Graqula: A Graphical Query Language for Entity–Relationship or Relational Databases"; Gary H. Sockut et al.; NY (US) Mar. 14, 1991.

Jasis; "A Graphical Filter/Flow Representation of Boolean Queries: A Prototype Implementation and Evaluation"; Degi Young et al.; vol. 44, #9; Jul. 1993.

IBM Technical Disclosure Bulletin; "Dynamic, Interactive Show SQL Window"; K. R. Banning et al.; vol. 35; No. 4A; Sep. 1992.

13th International Conference on Research and Development in Information Retrieval; "A Direct Manipulatin Interface for Boolean Information Retrieval via Natural Language Query"; Peter G. Anick et al.; Sep. 1990.

IBM, "DB2 World Wide Web Connection", internet, http://www.software/ib...data, 1995.

James Powell "World Wide Web Creating A Hypertext Library Information Systems", Database, pp. 59–66, 1994.

Steven Baker, "Hypertext browsing on the Internet", Unix Review v12 n9 p21(6), 1994.

*Primary Examiner*—Thomas G. Black
*Assistant Examiner*—Greta L. Robinson
*Attorney, Agent, or Firm*—Merchant, Gould, Smith, Edell, Welter & Schmidt

[57] ABSTRACT

The present invention discloses a method and apparatus for executing SQL queries in a relational database management system via the World Wide Web of the Internet. In accordance with the present invention, Web users can request information from RDBMS software via HTML input forms, which request is then used to create an SQL statement for execution by the RDBMS software. The results output by the RDBMS software are themselves transformed into HTML format for presentation to the Web user.

12 Claims, 6 Drawing Sheets

ACCESSING A RELATIONAL DATABASE OVER THE INTERNET USING MACRO LANGUAGE FILES

BACKGROUND OF THE INVENTION

1. Field of the Invention

This invention relates in general to database management systems performed by computers, and in particular, to a method and apparatus for accessing a relational database over the Internet using macro language files.

2. Description of Related Art

With the fast growing popularity of the Internet and the World Wide Web (also known as "WWW" or the "Web"), there is also a fast growing demand for Web access to databases. However, it is especially difficult to use relational database management system (RDBMS) software with the Web. One of the problems with using RDBMS software on the Web is the lack of correspondence between the protocols used to communicate in the Web with the protocols used to communicate with RDBMS software.

For example, the Web operates using the HyperText Transfer Protocol (HTTP) and the HyperText Markup Language (HTML). This protocol and language results in the communication and display of graphical information that incorporates hyperlinks. Hyperlinks are network addresses that are embedded in a word, phrase, icon or picture that are activated when the user selects a highlighted item displayed in the graphical information. HTTP is the protocol used by Web clients and Web servers to communicate between themselves using these hyperlinks. HTML is the language used by Web servers to create and connect together documents that contain these hyperlinks.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art for methods of accessing RDBMS software across the Internet network, and especially via the World Wide Web. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method and apparatus for executing SQL queries in a relational database management system via the Internet. In accordance with the present invention, Web users can request information from RDBMS software via HTML input forms, which request is then used to create an SQL statement for execution by the RDBMS software. The results output by the RDBMS software are themselves transformed into HTML format for presentation to the Web user.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

With the fast growing popularity of the Internet and the World Wide Web (also known as "WWW" or the "Web"), there is also an increasing demand for Web access to relational databases. The present invention is a DB2 WWW gateway that facilitates communication between Web clients, Web servers, and servers executing RDBMS software such as IBM's DB2 family of products. The DB2 WWW gateway enables an application developer to build Web applications for the RDBMS software using HTML forms and dynamic SQL.

An end user of these applications sees only the input forms for his/her requests and the resulting reports. Users fill out the input forms, point and click to navigate the forms, and to access the RDBMS software and relational database. A complete SQL command is dynamically built by the DB2 WWW gateway with the user inputs and sent to the server executing the RDBMS software. The SQL command is performed by the RDBMS software, and the resulting output is merged into the HTML forms by the DB2 WWW gateway for presentation to the user.

An application developer creates HTML forms and SQL queries and stores them in macro language files at the computer executing the DB2 WWW gateway. The macro language provides "cross-language variable substitution", thus enabling the application developer to use the full capabilities of: (a) HTML for creation of query or input forms and report forms, and (b) SQL for queries and updates. Since the DB2 WWW gateway uses native HTML and SQL languages, and not some new or hybrid language, various off-the-shelf tools may be used for creation of HTML forms and for generation of the SQL query.

HARDWARE ENVIRONMENT

Figure 1:
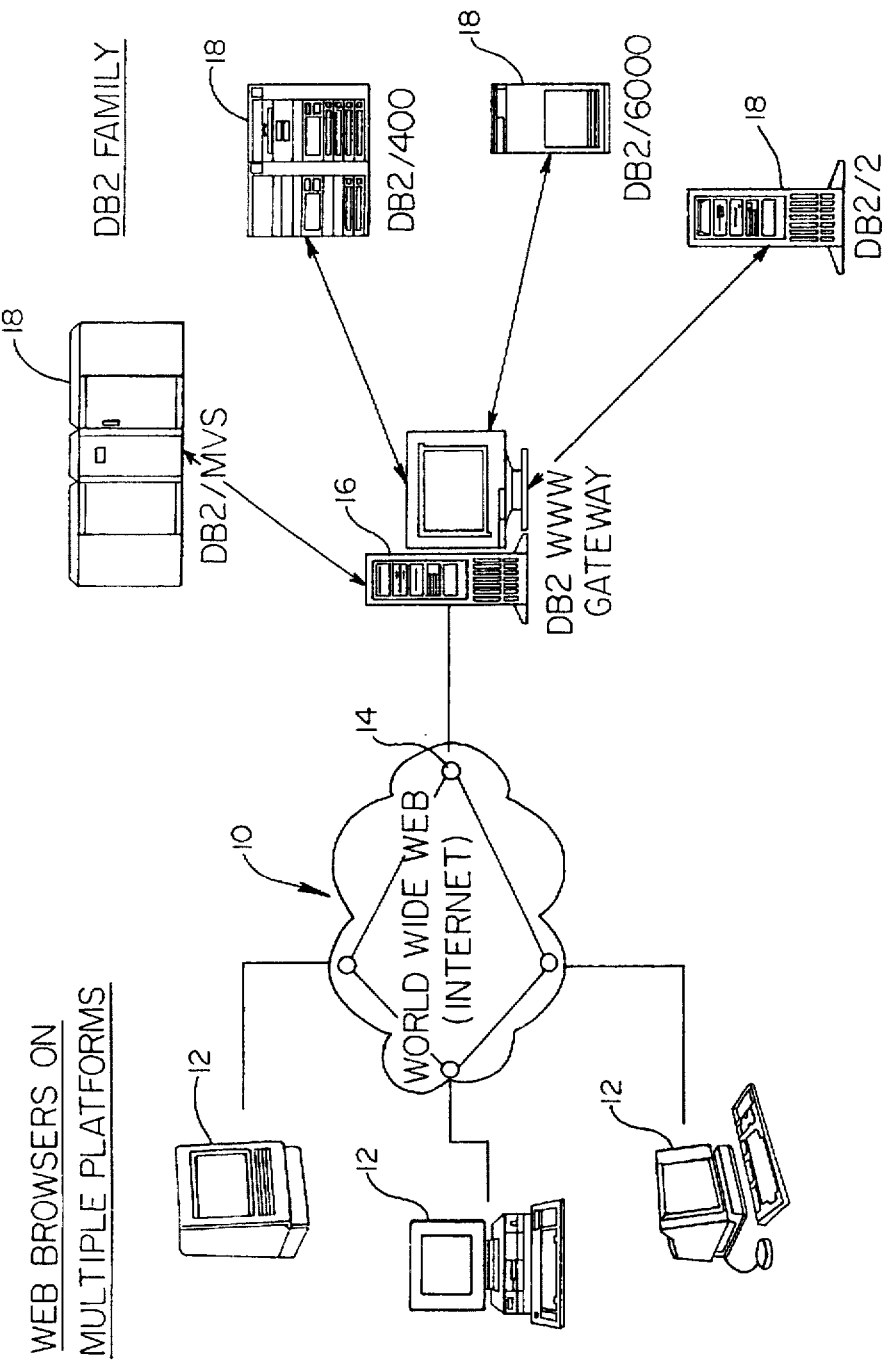
FIG. 1 schematically illustrates the hardware environment of the preferred embodiment of the present invention.

FIG. 1 schematically illustrates the hardware environment of the preferred embodiment of the present invention, and more particularly, illustrates a typical distributed computer system using the Internet 10 to connect client systems 12 executing Web browsers to server systems 14 executing Web daemons, to connect the server systems 14 executing Web daemons to server systems 16 executing the DB2 WWW gateway, and to connect the server systems 16 executing DB2 WWW gateways to server systems 18 executing the RDBMS software. A typical combination of resources may include clients 12 that are personal computers or workstations, and servers 14, 16, and 18 that are personal computers, workstations, minicomputers, or mainframes. These systems are coupled to one another by various networks, including LANs, WANs, SNA networks, and the Internet.

A client system 12 typically executes a Web browser and is coupled to a server computer 14 executing a Web server. The Web browser is typically a program such as IBM's Web Explorer, or NetScape or Mosaic. The Web server 14 is typically a program such as IBM's HTTP Daemon or other WWW daemon. The client computer 12 is bi-directionally coupled with the server computer 14 over a line or via a wireless system. In turn, the server computer 14 is bi-directionally coupled with a DB2 WWW server 16 over a line or via a wireless system. In addition, the DB2 WWW server 16 is bidirectionally coupled with a RDBMS server 18 over a line or via a wireless system.

The DB2 WWW gateway 16 supports access to a server 18 executing the RDBMS software. The DB2 WWW gateway 16 and RDBMS server 18 may be located on the same server as the Web server 14, or they may be located on separate machines. The servers 18 executing the RDBMS software may be geographically distributed and may comprise different vendor systems, such as a DB2, ORACLE, SYBASE, etc.

Those skilled in the art will recognize many modifications may be made to this configuration without departing from the scope of the present invention. For example, in a two-tier configuration, the server system executing the functions of the DB2 WWW gateway 16 may also execute the functions of the Web server 14 and/or the RDBMS server 18. Alternatively, in a three-tier configuration, the Web server 14, DB2 WWW gateway 16, and RDBMS server 18 may all be performed by different servers.

DB2 WWW GATEWAY

The DB2 WWW gateway 16 is designed to be sufficiently flexible and powerful, yet be available on multiple platforms, such as OS/2, AIX, MVS, etc. Further, the DB2 WWW gateway 16 is designed to work with existing Web and database application development tools, with minimal modifications required to such tools.

These goals led also to the development of the macro language of the present invention. The macro language is a combination of HTML and SQL, and incorporates a "cross-language variable substitution" mechanism that allows input data from an HTML-format input form to be inserted in an SQL-format query for the RDBMS software. The "cross-language variable substitution" mechanism also allows SQL query results to be merged into HTML report forms.

The runtime engine of the DB2 WWW gateway 16 reads the macro language files to generate the appropriate query or input forms, SQL queries, and report forms. The use of native HTML and SQL, instead of a new or hybrid language, allows the full expressive power of these languages without artificial limitations. Both query and report forms can be laid out in any fashion.

Moreover, existing tools may be used to generate the macro language files. For example, HTML editors from various vendors can be used to generate the HTML forms component, while SQL query interfaces, such as IBM's Visualizer Query, can be used to generate the SQL query component.

INTERACTION AMONG COMPONENTS

Figure 2:
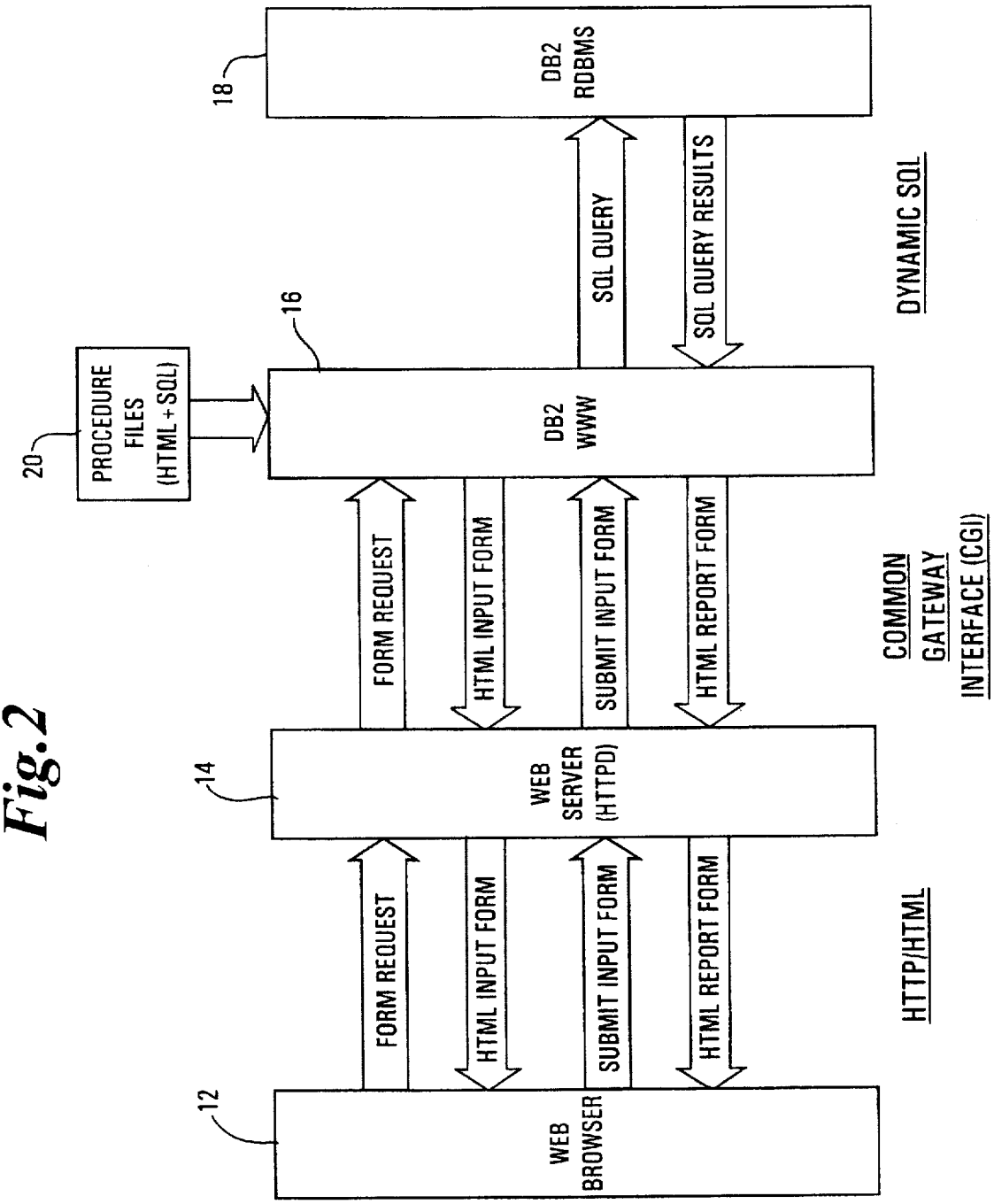
FIG. 2 shows schematically an overview of the preferred embodiment of the present invention, and in particular, shows the interaction among components in the present invention.

FIG. 2 shows schematically an overview of the preferred embodiment of the present invention, and in particular, shows the interaction among components in the present invention. The user interacts with the Web browser executing on a client computer 12 remotely located from the Web server 14. At some point, the user executes an HTTP command via the Web browser 12 that results in communication with an HTTP daemon executing on the Web server 14. The Web server 14 would then transmit an initial or home page in HTML format to the Web browser 12 for presentation to the user. The DB2 WWW gateway 16 would be invoked by the user selecting a hyperlinked item from the home page. It is envisioned that the DB2 WWW gateway 16 conforms to the Common Gateway Interface (CGI) defined for Web servers 14, and thus can be invoked from an HTML page in one of two ways: either by an HTTP anchor reference or by an HTTP form action.

An HTTP anchor reference would typically be formatted as follows: "<A HREF=http://{web-server}/{cgi-name}/{db2-www-gateway}/{macro-language-file}/{command}[?variable-name=variable-value & ... ]>".

An HTTP form action would typically be formatted in a similar manner as follows: "<FORM METHOD={method}ACTION=http://{web-server}/{cgi-name}/{db2-www-gateway}/{macro-language-file}/{command}[?variable-name=variable-value & ... ]>".

In both of the above examples, the following parameters are used:

"{web-server}" identifies the Web server;

"{cgi-name}" identifies the Common Gateway Interface (CGI) to the DB2 WWW gateway;

"{db2-www-gateway}" identifies the DB2 WWW gateway;

"{macro-language-file}" is the name of the macro language file to be executed;

"{command}" is generally either "input" or "report". If "input", then an HTML input form is displayed for the end user. If "report", then SQL commands in the {macro-language-file} are executed and an HTML report form is displayed for the end user.

"{method}" is either "GET" or "POST", as specified under the HTML standard;

"[?variable-name=variable-value & ... ]" are optional parameters that may be passed to the macro language file executed by the DB2 WWW gateway.

At some point in the interaction between the Web browser 12, the Web server 14, and the DB2 WWW gateway 16, the user would request data from a relational database managed by an RDBMS server 18. The DB2 WWW gateway 16 would retrieve a macro language file 20, extract an HTML input form from the macro language file 20, and transmit the HTML input form to the Web server 14. The Web server 14 transmits the HTML input form to the Web browser 12 for display to the user.

The user manipulates the HTML input form via the Web browser 12, by selecting functions and/or entering data into input boxes. When the user invokes a "submit" or "post" command, the data from the HTML input form, along with the command, is transmitted from the Web browser 12 to the Web server 14. The command would comprise a universal resource locator (URL) that invokes communications between the Web server 14 and the DB2 WWW gateway 16.

The DB2 WWW gateway 16 extracts the user inputs from the HTML input form, retrieves the associated macro language file 20, and substitutes these inputs into an SQL query from the macro language file 20. The DB2 WWW gateway 16 then transmits the SQL query to the RDBMS server 18 for execution. After performing an SQL query, the RDBMS server 18 returns the results of the SQL query, i.e., an output table, to the DB2 WWW gateway 16. The DB2 WWW gateway 16 extracts data from the output table and substitutes it into an HTML report form from the macro language file 20 using a common name space. A common name space arises from the use of common variables in both the HTML and SQL statements in the macro language file, and the cross-language variable substitution mechanism of the present invention. The resulting HTML report form is transmitted by the DB2 WWW gateway 16 to the Web server 14. The Web server 14 transmits the HTML report form to the Web browser 12 for presentation to the user. This interaction between the Web browser 12, the Web server 14, the DB2 WWW gateway 16, and the RDBMS server 18 may continue in a similar manner according to the user's direction.

DEVELOPMENT ENVIRONMENT

Figure 3:
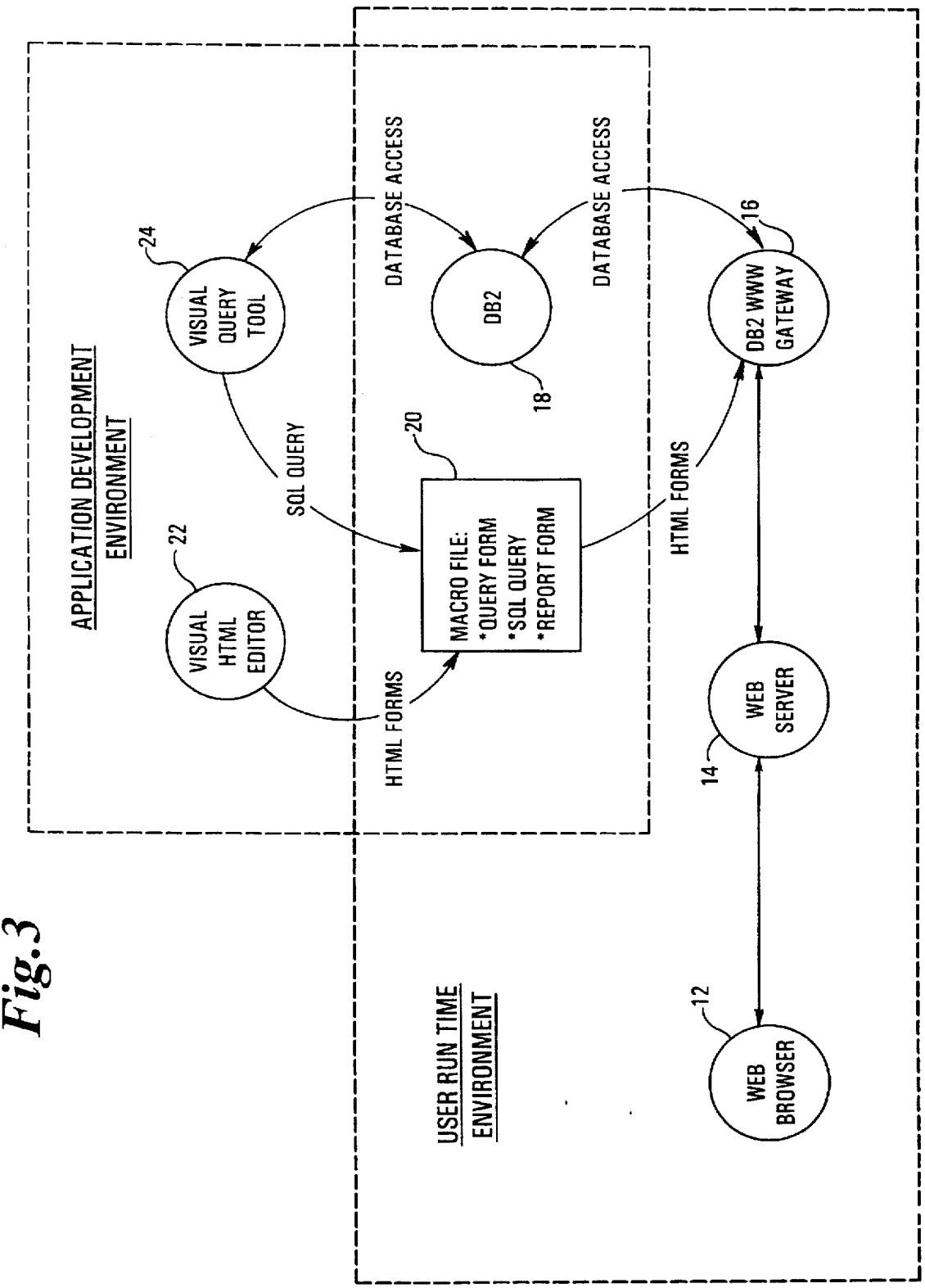
FIG. 3 shows schematically an overview of the preferred embodiment of the present invention, and in particular, shows the relationship between the user runtime environment and the application development environment of the present invention.

FIG. 3 shows schematically an overview of the preferred embodiment of the present invention, and in particular, shows the relationship between the user runtime environment and the application development environment of the present invention.

As mentioned earlier, the runtime environment includes the interaction between clients 12 executing Web browsers and Web servers 14, DB2 WWW gateways 16, and RDBMS servers 18. Access to the RDBMS server 18 and associated relational database via the DB2 WWW gateway 16 is controlled by programming stored in macro language files 20.

According to the present invention, the development of Web applications for accessing relational databases typically involves the following steps:

1. Create an HTML input form for display to the user;
2. Extract user inputs from HTML input forms and generate the appropriate SQL query via a common name space using a variable substitution mechanism;
3. Merge the SQL query results into an HTML report form; and
4. Allow for additional queries and HTML forms, possibly from the hyperlinks embedded in the HTML report forms.

The key challenge in writing applications for the DB2 WWW gateway is to understand both HTML and SQL languages, since these languages are embedded inside the macro language files. In its simplest forms, basic knowledge of SQL and HTML can be easily acquired. However, these languages can be quite complex and tedious to write in order to utilize their advanced functions. Fortunately, there are existing HTML editors 22 and SQL query tools 24 that can help to greatly reduce the complexity of writing the macro language files. Using HTML editors 22 and SQL query tools 24, the application developer creates the macro language files 20, wherein each of the macro language files 20 containing SQL commands and the associated query and report forms in HTML format.

MACRO LANGUAGE DEFINITIONS

According to the preferred embodiment of the present invention, each macro language file typically contains three sections:

1. An SQL command section identified as follows: % SQL {sql command section %}
2. An HTML input form section identified as follows: % HTML_INPUT {html input form section %}
3. An HTML report form section identified as follows: % HTML_REPORT{html report form section %}

The macro language contains directives, which are reserved keywords with a prefix symbol "%" (e.g., % SQL). Many of the directives have both a single line form and a block form, which supports multiple lines of text. These block directives are terminated with "%}", which can be anywhere on a line. In the preferred embodiment, nestings of blocks are not allowed, with the exception of the % EXEC-SQL block for the report form as described below.

SQL Directive

The SQL directive has the following format:

---

%SQL { any-valid-sql-commands-on-1-line %} or

%SQL
{
any-valid-sql-commands-on-1-or-more-lines
%}

---

The SQL directive identifies one or more SQL commands for execution by the RDBMS software. These SQL commands are executed sequentially, and the query results, if any, from the SQL commands are returned to the user for display.

HTML Input Form Directive

The HTML input form directive has the following format:

---

%HTML_INPUT { any-valid-html-text-on-1-line %} or

%HTML_INPUT
{
any-valid-html-text-on-1-or-more-lines
%}

---

The HTML input form directive contains the HTML commands comprising the input form used to accept input data from the user before generating the SQL query. The HTML input form section is needed only when user input is required to complete the SQL query.

HTML Report Form Directive

The HTML report form directive has the following format:

---

%HTML_REPORT{ any-valid-html-text-on-1-lines %} or

%HTML_REPORT
{
any-valid-html-text-on-1-or-more-lines
%EXECSQL { %}
any-valid-html-text-on-1-or-more-lines
%}

---

The HTML report form directive contains the HTML commands comprising the report form used to format query results for display to the user. The % EXECSQL sub-directive contains SQL commands to execute, as well as the query result variables and how they are to be formatted in the report. Any HTML commands before and after the % EXECSQL block may contain hyperlinks to other HTML pages or macro language files. Note, too, that if the % HTML_REPORT directive is missing, then a default table format is used to print out the query results.

Comment Directive

The HTML comment directive has the following format:

```
%{ any-text-on-1-line %}
   or
%{
   any-text-on-1-or-more-lines
%}
```

The comment directive contains the comments to be inserted anywhere in the macro language file, so long as it is not nested inside another component block. The terminating symbol "%" is required for terminating comments on a single line.

DEFINE Directive

The DEFINE directive has the following format:

```
%DEFINE define-statement
   or
%DEFINE
{
define-statement-1
define-statement-2
...
%}
```

The DEFINE directive defines the variables used in the macro language file. The "define-statement" above may be one of the following:
1. A simple variable assignment: varname="string-value"
2. A conditional variable assignment: varname= varname2?"value1":"value2"
3. A list variable declaration: % LIST "value-separator" varname The DEFINE directive defines the value strings that are to be substituted for the specified variables. When referenced, a simple variable is always substituted with the value string. A conditional variable is substituted with the first value string, if the tested variable name exists and is not null, or it is substituted with the second value string. A list variable is declared in the DEFINE section with the list property, wherein multiple value strings assigned to the list variable are concatenated together with the value-separator inbetween. The conditional and list variables are typically used together to construct portions of the SQL clause based on user inputs and selections from the HTML forms. The value-strings may contain other variables, which are de-referenced when used.

Variables may contain other variables. For example:

% DEFINE var1="$(var2).abc"

is permitted. However, circular references (i.e., cycles) are not allowed. For example, the DEFINE declarations below are not allowed:

% DEFINE a="$(b)"
% DEFINE b="$(a)"

A quote character (") may be included in a value string by using two consecutive quotes (""). Further, an empty string with two consecutive quotes is equivalent to a NULL string. For example, the DEFINE sections:

% DEFINE x="say ""hello"""
% DEFINE y=""

result in the variable x with the value 'say "hello"' and variable y with the value NULL. By definition, undefined variables are equivalent to NULL variables.

Variable Substitution

The "cross-language variable substitution" mechanism of the present invention is a key feature of the macro language, which allows:

1. Input data from the HTML input or query forms to be inserted into the SQL statements; and
2. SQL query results to be merged into HTML report forms.

The macro language allows variables to be defined in one of several ways:

1. DEFINE declaration. For example: % DEFINE varname="value-string"

2. HTML form's <SELECT> and <INPUT> statements. For example: <INPUT NAME="varname1"> or <SELECT NAME="varname2">. These variables are set by user inputs or preset by hidden fields in the HTML forms.

3. Query result variables are automatically set by the DB2 WWW gateway with the values from the SQL query results.

Variables are referenced in the macro language by using the syntax "$(variable)", wherein "variable" is the variable name. Variable references may appear in either SQL or HTML sections and nested variable references are allowed. However, at the time of its use, all variables must be de-referenced to their final values. Variables that have not been defined before use will be treated as having a value equal to an empty or null string.

As previously described, a variable may contain other variables (e.g., % DEFINE varx=". . . $ (var2) . . . "). Variables are de-referenced (substituted with their values) in an HTML section, where the values of these variables need to be printed out either for the HTML input form or the HTML report form. However, variables are not de-referenced at the time of their use in a % DEFINE section.

Consider the examples below:

% DEFINE X="One$(Y)$(Z)"

% DEFINE Y="Two"

HTML_INPUT {$(X) %}

% DEFINE Z="Three"

Variable X contains references to variables Y and Z. When the HTML input section is processed, Y is already defined, but Z is still undefined and is equivalent to NULL. Thus, $(X) is substituted with "One Two".

In addition, a "hidden variables" mechanism is available for the application developer to hide database internal structure (e.g., table and column names) and other sensitive information from the end user (because end users can view HTML source via their Web Browser). This is achieved by the following process:

1. Define a variable for each string that should be hidden, and put the DEFINE section for these variables after the HTML section where the variables are referenced, but before the SQL section where they are typically used.

2. In the HTML form section where the variables are referenced, use double dollar instead of single dollar to reference the variables (e.g. $$(X) instead of $(X)).

Consider the following example:

```
%HTML_INPUT
{
<FORM . . . >
Please select field to view:
<SELECT NAME="Field">
<OPTION VALUE="$$(name)"> Name
<OPTION VALE="$$(addr)"> Address
```

```
...
</FORM>
%}
%DEFINE{
name = "customer.name"
addr = "customer.address"
%}
%SQL SELECT $(Field) FROM customer
...
```

When the HTML input section is processed to return a form back to the user, $$(name) and $$(addr) are replaced with $(name) and $(addr). Hence, the real table and column values never appear on the HTML form. When the user submits the input form, the SQL section is processed and "$(Field)" is properly substituted with "customer.name, customer, addr".

There are also a number of "special system variables" that have special meaning to the DB2 WWW gateway 16. These special variables may be defined by the application developer in the macro language file or by the user from an input form. The current special variables include:

DATABASE: name of the database to be accessed; this variable must be defined.

LOGIN: database login name.

PASSWORD: database password associated with LOGIN name.

SHOWSQL: flag to show the SQL command on the report form; default is NULL.

In addition, predefined query report variables are available and currently include:

$(FN1), $(FN2), ..., $(FNn): field names for each of the columns defined in the table.

$(FV1), $(FV2), ..., $(FVn): row values for each of the columns defined in the table.

$(NR): total number of rows or records retrieved by the query.

USING THE MACRO LANGUAGE FILE

Figure 4:
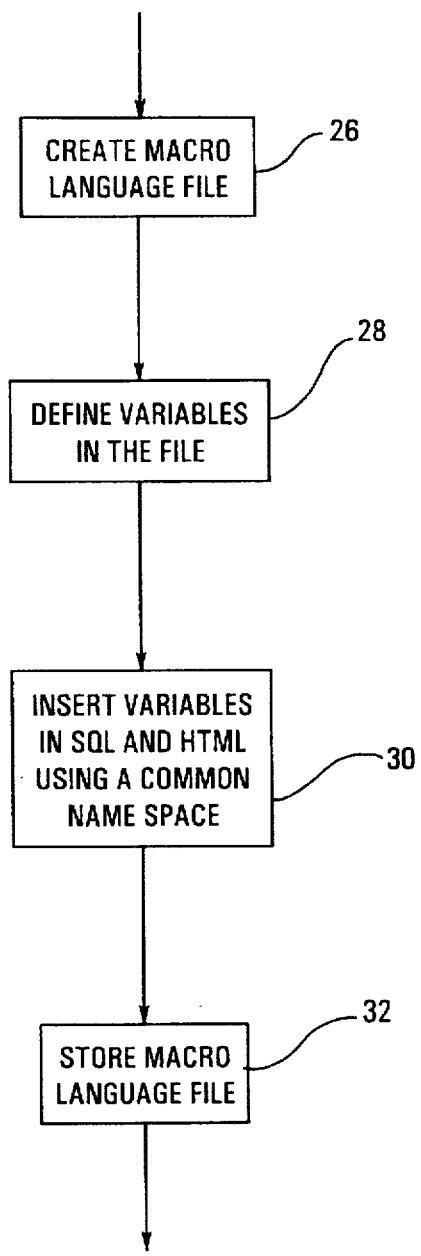
FIG. 4 is a flowchart illustrating the steps involved in creating macro language files according to the present invention.

FIG. 4 is a flowchart illustrating the steps involved in creating macro language files according to the present invention. Block 26 represents the creation of the macro language file. Block 28 represents the user defining variables in the macro language file using the % DEFINE directive. Block 30 represents the user inserting the variables into the SQL and HTML statements in the macro language file using a common name space, wherein a common name space indicates that the same variables may be used in either SQL or HTML statements in order to provide cross-language variable substitution capabilities. Block 32 represents the storing of the macro language file, typically on a disk drive or other peripheral attached to the DB2 WWW gateway 16.

Figure 5:
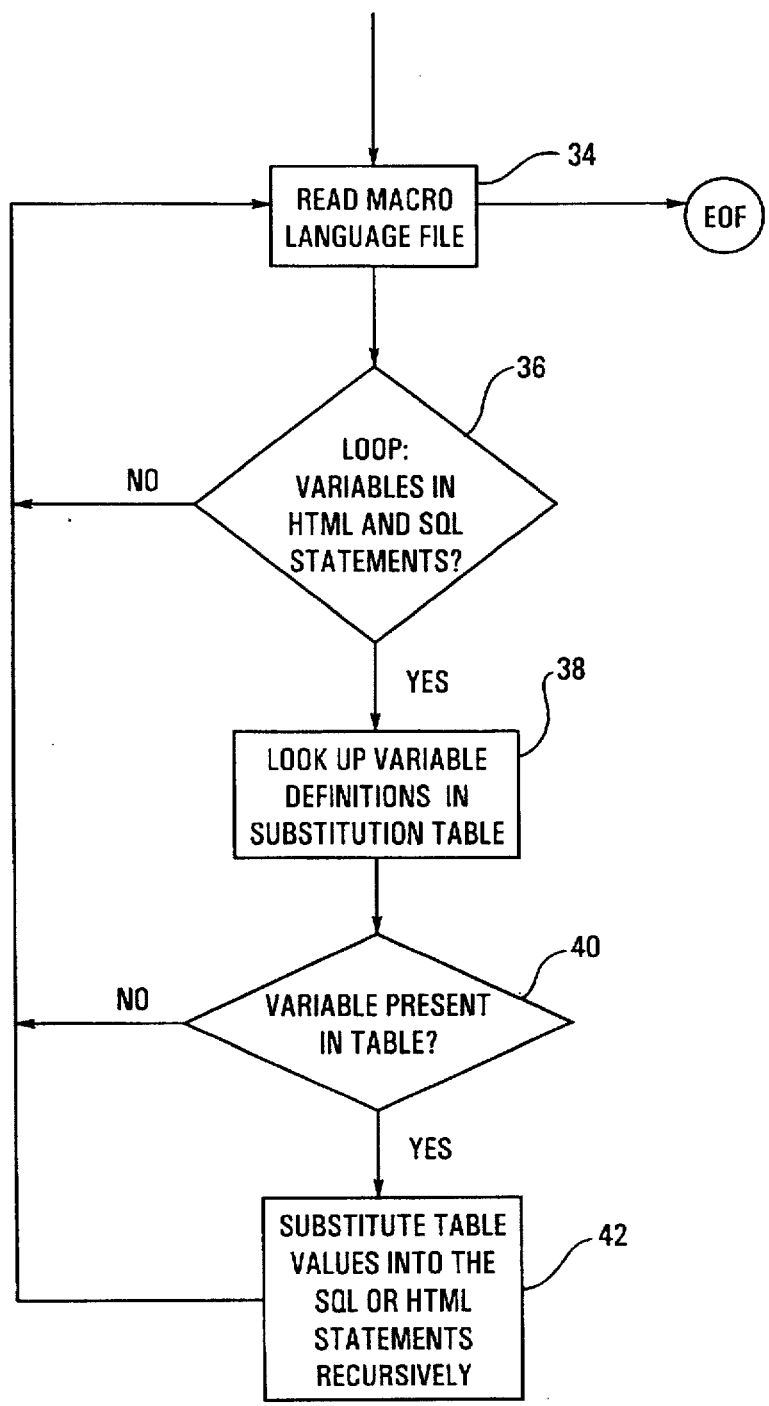
FIG. 5 is a flowchart illustrating the steps involved in using macro language files to provide access to a relational database according to the present invention.

FIG. 5 is a flowchart illustrating the steps involved in using macro language files to provide access to a relational database according to the present invention. Block 34 represents the DB2 WWW gateway 16 reading a macro language file in response to a command received from a Web browser 12 via a Web server 14. As each record is read from the macro language file, block 36 examines the record to determine whether or not a variable is found in the HTML or SQL statements stored in the macro language file. If so, control transfers to block 38, which looks up variable definitions in the variable substitution table maintained by the DB2 WWW gateway 16. Block 40 is a decision block that determines whether or not the variable can be found in the variable substitution table. If not, no substitution occurs and control transfers to block 34 to read additional records from the macro language file. Otherwise, control transfers to block 42, which represents the DB2 WWW gateway 16 substituting the table values for the variable into the SQL or HTML statements in a recursive manner.

Figure 6:
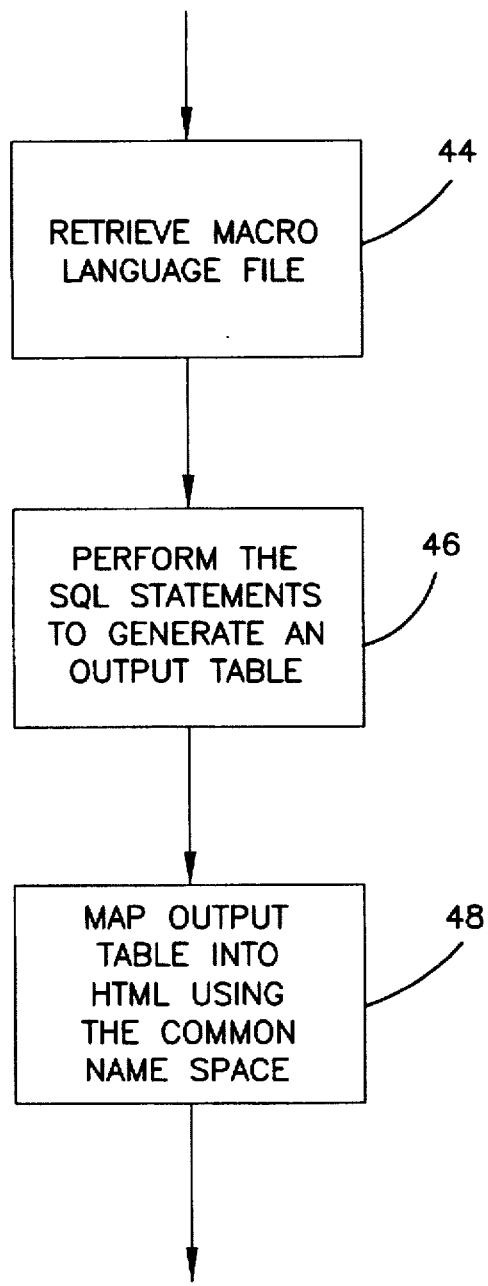
FIG. 6 is a flowchart illustrating the steps involved in using a macro language file to generate a dynamic SQL query and then merging the results of that query into an HTML report form.

FIG. 6 is a flowchart illustrating the steps involved in using a macro language file to generate a dynamic SQL query and then merging the results of that query into an HTML report form. Block 44 represents the DB2 WWW gateway 16 retrieving the indicated macro language file, extracting the SQL statements therefrom, and performing the necessary variable substitution using the input data from the user. Block 46 represents the DB2 WWW gateway 16 transmitting the SQL statement to the RDBMS server 18 and the RDBMS server 18 performing the SQL statement to generate an output table. The output table is then returned to the DB2 WWW gateway 16 processing. Block 48 represents the DB2 WWW gateway 16 mapping the output table into the HTML report form from the macro language file using the common name space. Again, the common name space indicates that variables may be embedded in the HTML report form that allows cross-language variable substitution to occur, so that the output table is correctly merged into the HTML report form. Thereafter, the DB2 WWW gateway 16 transmits the HTML report form to the Web server 14 and then on to the Web browser 12 for presentation to the user.

Example Macro Language Files

The use of the macro language and variable substitution mechanism of the present invention are best illustrated by the examples set forth below. In these examples, the macro language files have an extension ".d2w". The DB2 WWW gateway looks for file names with this extension when opening macro language files for processing.

Example 1: HTML-to-SQL Substitution

Consider the following macro language file "example1" using HTML to SQL variable substitution:

```
%HTML_INPUT
{
<FORM METHOD = "post" ACTION = http:// ibm.com
    / db2www / example1 / report">
Please select one or more fields:
<SELECT NAME="Fields" MULTIPLE SIZE=4>
<OPTION> Name
<OPTION> Address
<OPTION> Phone
<OPTION> Fax
</SELECT>
<INPUT TYPE="submit" Value="Submit Query">
</FORM>
%}
%DEFINE DATABASE="CUSTOMERDB"
%SQL SELECT $(Fields) FROM CustomerTbl
%HTML_REPORT
{
Information Requested:
%EXECSQL{ %}
<A HREF="...">Return to Homepage</A>
%}
```

The macro language file above may first be invoked by the URL "http://ibm.com/db2www/example1/input", which is embedded as an anchor reference in an HTML home page. When the end user clicks on the anchor item, the DB2 WWW gateway is activated, and the user is presented with the HTML input form.

The macro language file above allows the user to select a field from the customer table. Multiple fields, such as "Name" and "Phone", may be selected. When the user clicks on the "[Submit Query]" button, the macro language file is again processed by the form action "http://ibm.com/db2www/example1/report". The user inputs obtained from the HTML <SELECT> statement are substituted into the $(Fields) in the SQL clause. The submission of the HTML input form returns the user-selected result in the form "Fields=Name & Fields=Phone". The variable "$(Fields)" in the SQL statement are replaced with "Name, Phone" (including the comma).

When the HTML report section is processed, the HTML text proceeding the % EXECSQL is printed first, followed by a default query table report, and the HTML text after the report. The report is displayed as follows:

| Information Requested: | |
| Name | Phone |
| --- | --- |
| Smith, John | 415-555-1212 |
| Doe, David | 408-555-1212 |
| [Return to Home Page] | |

Example 2: Conditional and List Variables
Consider the following macro language file:

```
%HTML_INPUT
{
Specify Search string patterns for
Name: <INPUT TYPE="text" NAME="SubString1">
Addr: <INPUT TYPE="text" NAME="SubString2">
%}
%DEFINE
{
%LIST "and" Condition
Condition = "Name LIKE ""$(SubString1)"""
Condition = "City LIKE ""$(SubString2)"""
WhereClause = Condition ? "WHERE $ (Condition)" : ""
%}
%DEFINE DATABASE="CUSTOMERDB"
%SQL
{
SELECT Name, City FROM CustomerTb1
    $ (WhereClause)
%}
```

The HTML input form asks the users to type in the string patterns to match with the database fields Name and Addr. The user may type in one, two or no pattern at all. The variable condition is declared to be a list variable, and the variable WhereClause is conditionally assigned. Thus, $(WhereClause) will be substituted with one of the following values:

1. NULL (if the user leaves both inputs empty);
2. WHERE Name LIKE "S %" (if the user types in S % for Name and leave Addr empty); or
3. WHERE Name LIKE "S %" AND City LIKE "San Jose" (if the user types in S % for Name and San Jose for City).

Example 3: HTML-to-SQL Substitution
Consider the following macro language file "example3" using HTML to SQL variable substitution:

```
%DEFINE DATABASE="CUSTOMERDB"
%SQL SELECT $(Fields) FROM CustomerTb1
%HTML_INPUT
{
<FORM METHOD = "post" ACTION = "http:// ibm.com /
    db2www / example3 / report">
Please select one or more fields:
<SELECT NAME="Fields" MULTIPLE SIZE=4>
<OPTION> Name
<OPTION> Address
<OPTION> Phone
<OPTION> Fax
</SELECT>
<INPUT TYPE="submit" Value="Submit Query">
</FORM>
%}
```

The macro language file is invoked by the following URL: "http://ibm.com/db2www/example3/input", which is embedded as an anchor reference in an HTML home page. When the end-user clicks on the anchor, the DB2 WWW gateway is activated via the URL, and the user is presented with the HTML input form from the macro language file. The macro language file allows the user to select a field from the customer table file named "CustomerTb1". Multiple fields, such as "Name", "Address", "Phone", and "Fax" may be selected. The user inputs obtained from the HTML <SELECT> statement are substituted into the $(Fields) in the SQL clause. The HTML input form returns the user-selected result in a form such as "Fields=Name & Fields=Phone". The resulting $(Fields) in the SQL statement are replaced with "Name, Phone" (including the comma). Since the % HTML_REPORT directive is missing from the macro language file, a default table output is displayed as follows (assuming the fields Name and Phone are selected):

| Name | Phone |
| --- | --- |
| Smith, John | 415-555-1212 |
| Doe, David | 408-555-1212 |
| ... | |

Example 4: DEFINE Substitution
Consider the following macro language file "example4" using alias substitution:

```
%DEFINE Tb1="CustomerTb1"
%DEFINE Htxt="<H1>Customer Report </H1>"
%DEFINE DATABASE="CUSTOMERDB"
%SQL SELECT Name FROM $(Tb1)
%HTML_INPUT
{
$ (Htxt)
...
%}
```

In this macro language file, the variable $(Tb1) in the % SQL section is substituted with "CustomerTb1" and the variable $(Htxt) in the % HTML_INPUT section is substituted with the text string "<H1>Customer Report </H1>".

Example 5: HTML Report Form Substitution
Consider the following macro language file using report form substitution:

```
%DEFINE DATABASE="CUSTOMERDB"
%SQL SELECT Name, Phone, Fax FROM CustomerTb1
%HTML_REPORT
{
Address Query Result:"
%EXECSQL
{
$(FN1) : $(FV1)
Phone: $(FV2) Fax: $(FV3)
```

-continued

```
%}
Total records retrieved: $(NR)
%}
```

When invoked by the URL: "http://ibm.com/db2www/example5/report", the following report form will be displayed to the user:

```
Address Query Result:
Name: Smith, John
Phone: 415-555-1212    Fax: 415-555-1212

Name: Doe, David
Phone: 408-555-1212    Fax: 408-555-1212

Total records retrieved: 2
```

Example 6: Embedded Links to Other Macro Language Files

Due to the flexible variable substitution mechanism of macro language items displayed in the report form may link to other URLs, which include other HTML forms, CGI programs, or other macro language files. Examples of such linkages are provided below in macro language file "example6a":

```
%DEFINE DATABASE="CUSTOMERDB"
%SQL
{
SELECT Name, Company FROM CustomerTbl
WHERE Name LIKE "$(custname)"
%}
%HTML_INPUT
{
<FORM METHOD = "post" ACTION = "http:// ibm.com /
    db2www / example6a /report">
Enter name of customer for search:
<INPUT Name="custname">
<INPUT Type="Submit" Value="Search Now">
</FORM>
%}
%DEFINE URLprefix="http://ibm.com/"
%HTML_REPORT
{
Query Results. Please click on customer name to
get detailed description of customer information.
%EXECSQL
{
Name: <A HREF = "$(URLprefix) / db2www /
    example6b / report / cust = $(V1)">
$ (FV1) </A>
Company: $(FV2)
%}
<A HREF="$ (URLprefix) /homepage.html>
Go to home page</A>
%}
```

When invoked by the URL: "http://ibm.com/db2www/example6a/input", the following input form will be displayed to the user:

```
Enter name of customer for search: _____
[Search Now]
```

The user enters the name of the customer for the query into the input form, and then selects the "[Search Now]" button. The input form invokes the DB2 WWW gateway with the URL: "http://ibm.com/db2www/example6a/report", and the following report form is displayed to the user:

```
Query Results. Please click on customer name to
get detailed description of customer information.
Name: [John Smith]
Company: Mikrotuf Corporation
Name: [David Doe]
Company: Orakel Limited
[Go to home page]
```

The text between the brackets are displayed as highlighted hyperlinks that may be selected by the user. For example, if the user selects "[Go to home page]", then he or she will jump to the HTML page "homepage.html".

Alternatively, if the user selects "[John Smith]", then DB2 WWW gateway is invoked with the following URL: "http://ibm.com/db2www/example6b/report/[?cust=John Smith]", and the following macro language file is retrieved:

```
%DEFINE DATABASE="CUSTOMERDB"
%SQL
{
SELECT Name, Title,  Phone FROM CustomerTbl
                WHERE Name LIKE "$(cust)"
%}
%HTML_REPORT
{
Detailed customer information %EXECSQL
{
Name = $(FV1)
Title = $(FV2)
Phone = $(FV3)
%}
%}
```

After the SQL query in the macro language file is executed, with "John Smith" replacing the "$(cust)" variable, then the HTML report form is displayed for the user:

```
Detailed customer information

Name = John Smith
Title = VP of Research and Development
Phone = 415-555-1212
```

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the HTTP protocol or the HTML or SQL language standards could benefit from the present invention.

In summary, the present invention discloses a method and apparatus for executing SQL queries in a relational database management system via the World Wide Web of the Internet. In accordance with the present invention, Web users can request information from RDBMS software via HTML input forms, which request is then used to create an SQL statement for execution by the RDBMS software. The results output by the RDBMS software are themselves transformed into HTML format for presentation to the Web user.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for executing Structured Query Language (SQL) queries in a computer-implemented relational database management system via a network, comprising the steps of:
   (a) transmitting a HyperText Markup Language (HTML) input form to a browser executed by a client computer in the network for display on a monitor attached thereto;
   (b) receiving a HyperText Transfer Protocol (HTTP) request from the browser to access the relational database, wherein the request includes data entered by the user into the HTML input form;
   (c) substituting the data entered by the user into the HTML input form into a dynamic SQL query using a common name space, wherein the common name space comprises variables found in both the dynamic SQL query and the HTML input form;
   (d) transmitting the SQL query to a relational database management system for execution;
   (e) receiving an output table from the relational database management system in response to the transmitted SQL query;
   (f) merging the output table from the relational database management system into an HTML report form; and
   (g) transmitting the HTML report form to the browser for display on the monitor attached to the client computer.

2. The method of claim 1 above, wherein the merging step comprises the step of merging the output table from the relational database management system into an HTML report form using a common name space, wherein the common name space comprises variables found in both the output table and the HTML report form.

3. The method of claim 1 above, wherein the HTML input form, dynamic SQL query and HTML report form are stored in a macro language file.

4. The method of claim 3 above, wherein the macro language comprises an SQL command section, an HTML input form section, and an HTML report form section.

5. A method of variable substitution in a macro language file, comprising the steps of:
   (a) reading a macro language file containing both Structured Query Language (SQL) and HyperText Markup Language (HTML) statements;
   (b) parsing each of the SQL and HTML statements to identify definitions and uses of variables in the SQL and HTML statements; and
   (c) substituting values assigned to the variables from the definitions of the variables to the uses of the variables at the time that the SQL and HTML statements are processed.

6. The method of claim 5 above, wherein the substituting step comprises the steps of:
   (1) looking up definitions of variables in a variable substitution table when an SQL or HTML statement containing the variable is processed;
   (2) if the variable is present in the variable substitution table, then substituting the value from the variable substitution table into the SQL or HTML statements; and
   (3) if the variable is not present in the variable substitution table, then leaving the variable name intact in the SQL or HTML statement until a next time that the SQL or HTML is processed by the system.

7. The method is defined is claim 6 above, wherein the substituting step further comprises performing the substitution step recursively.

8. A method of creating a macro language file, comprising the steps of:
   (a) creating a macro language file to contain both Structured Query Language (SQL) statements and HyperText Markup Language statements (HTML);
   (b) defining one or more variables in the macro language file;
   (c) using the defined variables in both the SQL and HTML statements in the macro language file to represent a common name space for both data retrieval and display presentation; and
   (d) storing the macro language file containing both the SQL and HTML statements to a data storage device.

9. A method of retrieving data from a relational database, comprising the steps of:
   (a) retrieving a macro language file containing both Structured Query Language (SQL) statements and HyperText Markup Language (HTML) statements from a data storage device;
   (b) transmitting the SQL statements to a relational database management system, wherein the relational database management system performs the SQL statements to generate an output result table; and
   (c) receiving the output result table from the relational database management system; and
   (d) mapping the output result table into the HTML statements of the macro language file using a common name space, wherein variable names identified in the HTML statements correspond to variable names identified in the SQL statements.

10. The method of claim 9 above, wherein the common name space comprises predefined variables associated with output table columns.

11. The method of claim 9 above, wherein the common name space comprises variables associated with output table columns.

12. The method of claim 9 above, wherein the common name space comprises output table column names.

* * * * *

UNITED STATES PATENT AND TRADEMARK OFFICE
CERTIFICATE OF CORRECTION

PATENT NO. : 5,737,592
DATED : April 7, 1998
INVENTOR(S) : Tam Minh Nguyen and Venkatachary Srinivasan It is certified that error appears in the above-identified patent and that said Letters Patent is hereby corrected as shown below:

On the title page, item [54] and Column 1, line 1:

in the Title, after the word "LANGUAGE" delete "FILES" and insert --FILE CONTAINING BOTH SQL AND HTML STATEMENTS--

Column 1, Line 3, after the word "LANGUAGE" delete "FILES" and insert --FILE CONTAINING BOTH SQL AND HTML STATEMENTS--

Column 10, Line 42, before "http:" insert --"--

Signed and Sealed this

Twenty-eighth Day of March, 2000

*Attest:*

Q. TODD DICKINSON

*Attesting Officer*  *Commissioner of Patents and Trademarks*